(12) United States Patent
Luce

(10) Patent No.: US 8,079,548 B2
(45) Date of Patent: Dec. 20, 2011

(54) GROUND SENSING SYSTEM

(75) Inventor: William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 391 days.

(21) Appl. No.: 12/417,293

(22) Filed: Apr. 2, 2009

(65) Prior Publication Data

US 2010/0252678 A1 Oct. 7, 2010

(51) Int. Cl.
*B64C 25/32* (2006.01)
(52) U.S. Cl. .................. 244/103 R; 244/103 W
(58) Field of Classification Search .............. 244/103 W
See application file for complete search history.

(56) References Cited

U.S. PATENT DOCUMENTS

| | | | |
|---|---|---|---|
| 2,477,881 A * | 8/1949 | King ........................ | 244/102 R |
| 2,677,516 A * | 5/1954 | Pilling ..................... | 244/103 R |
| 2,692,098 A * | 10/1954 | Schmued et al. .......... | 244/104 R |
| 3,129,903 A * | 4/1964 | Dewar et al. ............... | 244/111 |
| 3,680,885 A * | 8/1972 | DeCardi et al. ............. | 280/762 |
| 5,801,301 A * | 9/1998 | Jeong ......................... | 73/115.01 |
| 7,439,852 B1 * | 10/2008 | Pledger ....................... | 340/443 |
| 7,731,124 B2 * | 6/2010 | Griffin ........................ | 244/102 R |

* cited by examiner

*Primary Examiner* — Joshua Michener
*Assistant Examiner* — Brian M O'Hara
(74) *Attorney, Agent, or Firm* — Scott D. Wofsy; Edwards Wildman Palmer LLP

(57) ABSTRACT

A ground sensing system for an aircraft attaches to the aircraft's landing gear to provide a ground touch indication. The ground sensing system includes a bracket, an upper arm, a lower arm, a roller and a sensor. The bracket is mounted to the landing gear while the upper arm is pivotally and biasly coupled to the bracket. The lower arm is pivotally and biasly coupled to the upper arm. The roller mounts to the lower arm and extends just slightly beneath a lowermost surface of the tire when the aircraft is airborne. The sensor is triggered once a portion of the upper arm has sufficiently entered the sensor's field of view, which occurs when the roller is urged upward by the ground during landing.

17 Claims, 11 Drawing Sheets

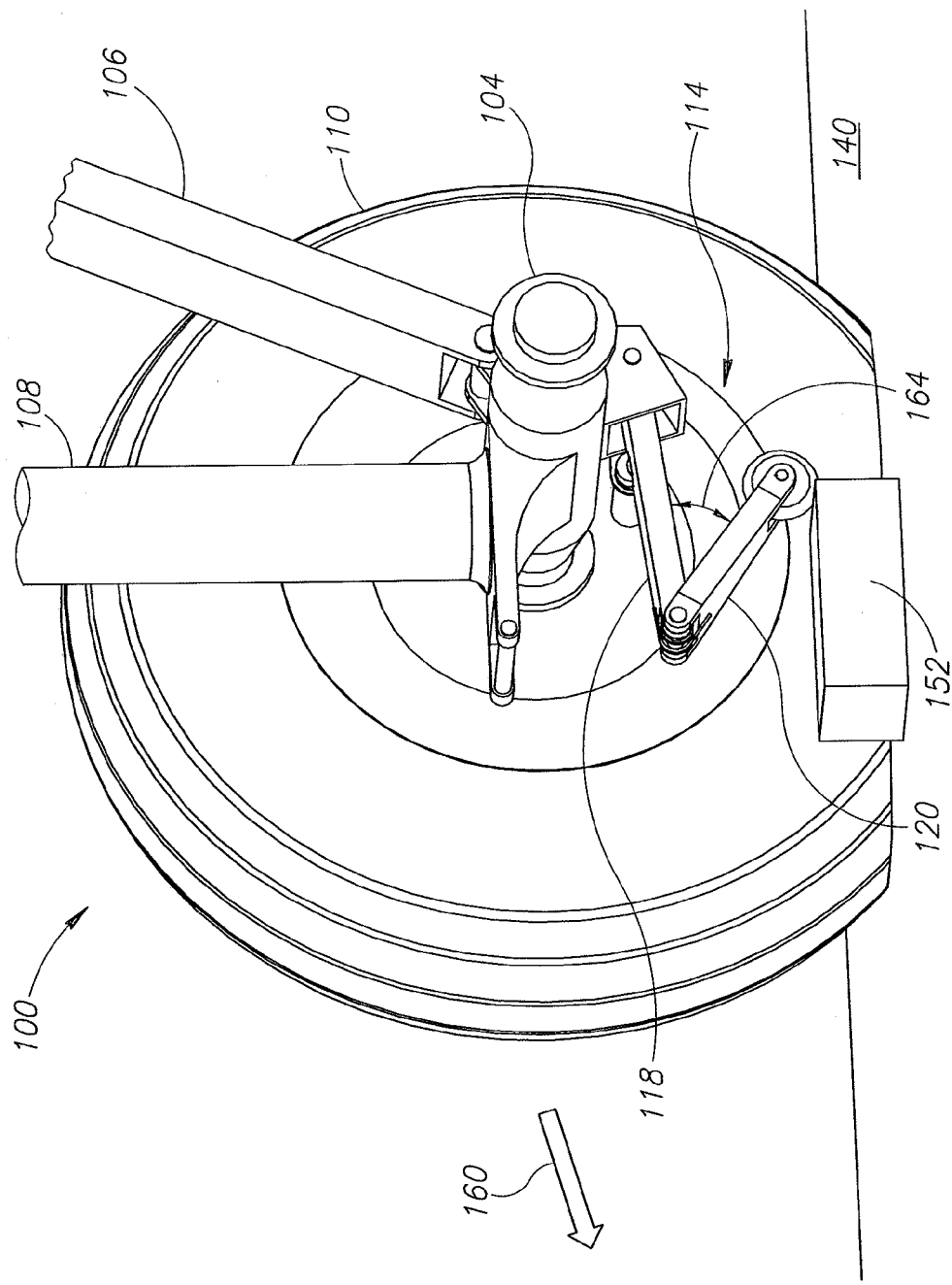

ued States Patent No. US 8,079,548 B2

GROUND SENSING SYSTEM

FIELD OF THE INVENTION

This invention relates to a ground sensing system for aircraft wheels, and more specifically a ground sensing system for providing an indication when one or more of the aircraft's wheels have touched the ground.

BACKGROUND OF THE INVENTION

Landing gear systems for vertical takeoff and landing (VTOL) aircraft, which include rotary-wing aircraft (e.g., helicopters), may be non-retractable or retractable. Some VTOL aircraft have a nose landing gear while others have a tail landing gear, and still others have both. The landing gear components for a VTOL aircraft are generally similar to those components used in a fixed-wing aircraft landing gear system. The main landing gear system generally supports the VTOL aircraft on the ground and cushions it from shock during landing. The main landing gear system typically includes a shock strut, torque arm, which may also take the form of a drag beam or side beam depending on a retraction direction of the landing gear, an axle or spindle, one or more wheels or tires, a braking system and a weight-on-wheels system, which may take the form of a weight-on-wheels sensing switch.

The weight-on-wheels switch provides ground or flight status indications for various systems of the VTOL aircraft and for a variety of maneuvers. By way of example, the weight-on-wheels switch provides an indication as to whether the aircraft is touching the ground or airborne. When the aircraft is on the ground, the switch is compressed in relationship to a small stroke of the shock absorber, which results from at least an incremental amount of the aircraft weight being transferred to the ground. Typically, only a small amount of the aircraft's weight is required to achieve the small stroke of the shock absorber, where the stroke distance is generally about 0.25 to about 0.50 inches. Next, an on-board computer system of the VTOL aircraft receives an indication that the aircraft is at least touching the ground.

SUMMARY OF THE INVENTION

A ground sensing system for an aircraft, and in particular a fly-by-wire vertical takeoff and landing (VTOL) aircraft, is attachable to the aircraft's landing gear to provide a ground touch indication instead of a full weight-on-wheels indication. The ground sensing system includes a bracket, an upper arm, a lower arm, a roller and a sensor. The bracket is mounted to the landing gear while the upper arm is pivotally and biasly coupled to the bracket. The lower arm is pivotally and biasly coupled to the upper arm. The roller mounts to the lower arm and extends just slightly beneath a lowermost surface of the tire when the aircraft is airborne. As such, the roller is the first component of the aircraft to make contact with the ground during landing and the last component to leave the ground during takeoff. The sensor is triggered once a portion of the upper arm has sufficiently entered the sensor's field of view, which occurs when the roller is urged upward by the ground during landing In one example of the invention, a ground sensing system for a tire of an aircraft includes a bracket coupled to a tire spindle of the aircraft; an upper arm having a first end portion and a second end portion, the first end portion pivotally and biasly coupled to the bracket about an upper arm pivot; a swing arm having an upper end portion and a lower end portion, the upper end portion pivotally and biasly coupled to the second end portion of the upper arm; a roller coupled to the lower end portion of the swing arm; and a sensor located proximate the upper arm and positioned to detect a presence of the upper arm after a portion of the upper arm rotates upward by a desired amount about the upper arm pivot.

In another example of the invention, a method for detecting contact between an aircraft tire surface and a contact surface includes the steps of (1) mounting a bracket to a tire spindle coupled to the aircraft tire; (2) pivotally coupling a first end portion of a swing arm assembly to the bracket, the swing arm assembly including a roller distally located from the first end portion; (3) positioning a contact portion of the roller to be substantially level with the portion of aircraft tire that contacts the contact surface when the aircraft tire is adequately inflated; and (4) receiving a signal from a sensor positioned to detect a presence of a portion of the swing arm assembly after the portion has rotated upward by a desired amount relative to the tire spindle.

In yet another example of the invention, a ground sensing system for a tire of an aircraft includes a bracket coupled to a tire spindle of the aircraft; an arm assembly having a first end portion and a second end portion, the first end portion pivotally and biasly coupled to the bracket about an upper arm pivot; a ground contact device coupled to the second end portion of the arm assembly; and a detection mechanism located proximate the arm assembly and positioned to detect a presence of the arm assembly after a portion of the arm assembly rotates upward by a desired amount about the upper arm pivot.

BRIEF DESCRIPTION OF THE DRAWINGS

The preferred and alternative embodiments of the present invention are described in detail below with reference to the following drawings.

FIG. 5B shows a perspective view of the ground sensing system of FIG. 1 encountering an obstacle when the landing gear is moving in a forward direction according to an embodiment of the present invention;

DETAILED DESCRIPTION OF THE PREFERRED EMBODIMENT

In the following description, certain specific details are set forth in order to provide a thorough understanding of various embodiments of the invention. However, one skilled in the art will understand that the invention may be practiced without these details. In other instances, well-known structures associated with aircraft, aircraft landing gear systems, and ground sensing systems and the operation thereof have not necessarily been shown or described in detail to avoid unnecessarily obscuring descriptions of the embodiments of the invention.

The following description generally relates to a ground sensing system, which may be referred to as a tire-touching, ground sensing system, is attached to a landing gear of an aircraft. The aircraft may generally take the form of a vertical takeoff and landing (VTOL) aircraft that utilizes fly-by-wire (FBW) controls. Generally, it is desirable if VTOL aircraft with FBW controls are able to "feel the ground" because this permits a pilot to initiate and complete certain maneuvers with more precision than otherwise achievable with conventional weight-on-wheels (WOW) sensing systems. The ground sensing system generally includes a swing arm assembly with a ground contact roller, which is coupled to one or more arm members that are positioned proximate a sensor. During the landing event, for example, at least a portion of the swing arm assembly deflects (e.g., rotates) by an amount to trigger or otherwise activate the sensor, which in turn generates a suitable signal that may be processed and eventually provided to the pilot to provide a notification that the tire has touched the ground.

Figure 1:
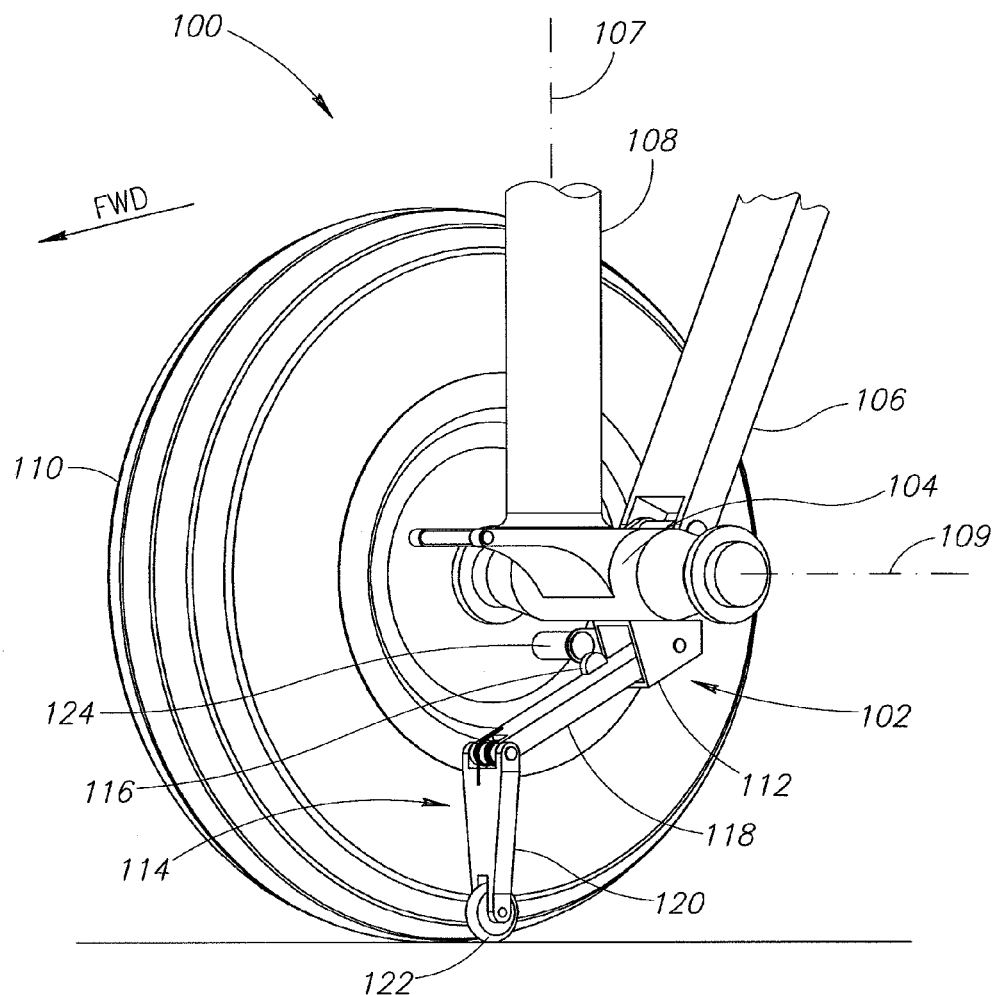
FIG. 1 shows a perspective view of a landing gear system having a ground sensing system attached thereto according to an embodiment of the present invention.

FIG. 1 shows a portion of a landing gear system 100 with a ground sensing system 102 attached thereto. The landing gear system 100 includes a tire spindle 104 coupled to a drag beam 106 and a landing gear strut 108. Typically, the drag beam 106 is pin connected to the spindle 104, and is thus able to rotate relative to a vertical plane defined by a strut axis 107 of the landing gear strut 108 and a spindle axis 109 of the tire spindle 104. In the illustrated embodiment, two wheels or tires 110 are rotationally attached to each end portion of the tire spindle 104; however for purposes of clarity only one tire 110 is shown. However, it is appreciated that the landing gear system 100 may have a single tire or more than two tires in other embodiments. The landing gear system 100 is shown in an initial landing configuration in which the tire 110 is in an inflated condition and at least some of the aircraft's weight is just beginning to be transferred onto the ground.

The ground sensing system 102 includes a bracket 112 pivotally and biasly coupled to the tire spindle 104 as described in more detail below. A swing arm assembly 114 is coupled to the bracket 112 and includes a triggering member 116, an upper arm 118, a lower arm or swing arm 120, a ground contact device 122 and a detection mechanism 124 for detecting whether the swing arm assembly 114 has rotated by a desired amount due to contact with the ground. The upper arm 118 is pivotally and biasly coupled to the bracket 112.

Similarly, the swing arm 120 is pivotally and biasly coupled to the upper arm 118. The ground contact device 122 is coupled to the swing arm 120 and extends slightly beneath a lowermost surface 138 (FIGS. 3A and 3B) of the tires 110 when the aircraft is airborne. Stated alternatively, the ground contact device 122 is the first component of the landing gear system 100 to touch the ground during a landing event and the last component to lose contact with the ground during a takeoff event. In one embodiment, the detection mechanism 124 is positioned proximate the upper arm 118 and oriented to be triggered or activated by movement of at least a portion (e.g., the triggering member) of the upper arm 118 just before or coincident to the tire 110 making contact with the ground during the landing event. By way of example, the ground contact device 122 may take the form of a roller or a device fixed to the swing arm 120 and having an abrasion resistive coating.

Figure 2:
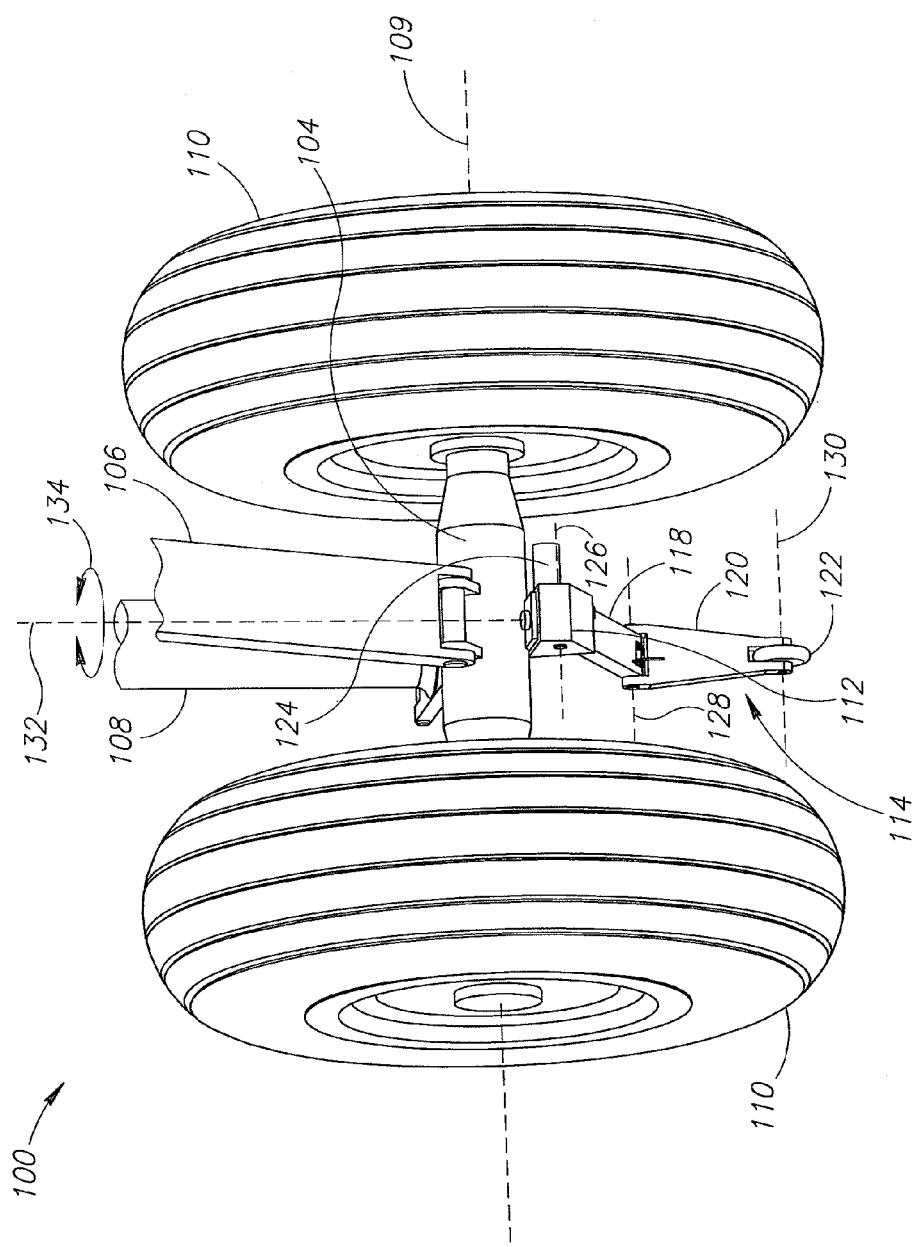
FIG. 2 shows a rear perspective view of the landing gear system of FIG. 1 with various pivot axes for the ground sensing system according to an embodiment of the present invention.

FIG. 2 shows the various pivot or rotational axes as applied to the landing gear system 100 and the ground sensing system 102. The tires 110 rotate about the spindle axis 109. The upper arm 118 pivots about an upper arm pivot axis 126, which is substantially parallel to the spindle axis 109. In addition, the swing arm 120 pivots about a swing arm pivot axis 128, which is also substantially parallel to the spindle axis 109. The ground contact device 122 may rotate about a ground contact device axis 130, which is also substantially parallel to the spindle axis 109. The bracket 112 and the other components of the swing arm assembly 114 (FIG. 1) pivot about a bracket pivot axis 132. In one embodiment, the bracket pivot axis 132 is substantially vertical to a horizontal plane such as the ground. Stated otherwise, the bracket pivot axis 132 extends normal or orthogonal relative to the spindle axis 109 while also extending parallel relative to the strut axis 107 (FIG. 1).

Accordingly, the bracket 112 and the swing arm assembly 114 may pivot about the bracket pivot axis 132 in both clockwise and counterclockwise rotational directions defined by rotational arrow 134. As a result, if a side load were applied to the swing arm assembly 114, it would be permitted to freely pivot toward either tire 110 in response to the applied side load. Further, the bracket 112 may be biasly coupled or otherwise spring loaded with respect to the tire spindle 104 to maintain the swing arm assembly 114 in a substantially centered position between the tires 110, as shown in the illustrated embodiment. The pivotal movement of the bracket 112 and the swing arm assembly 114 is described in greater detail with respect to FIGS. 4A and 4B below.

Figure 3A:
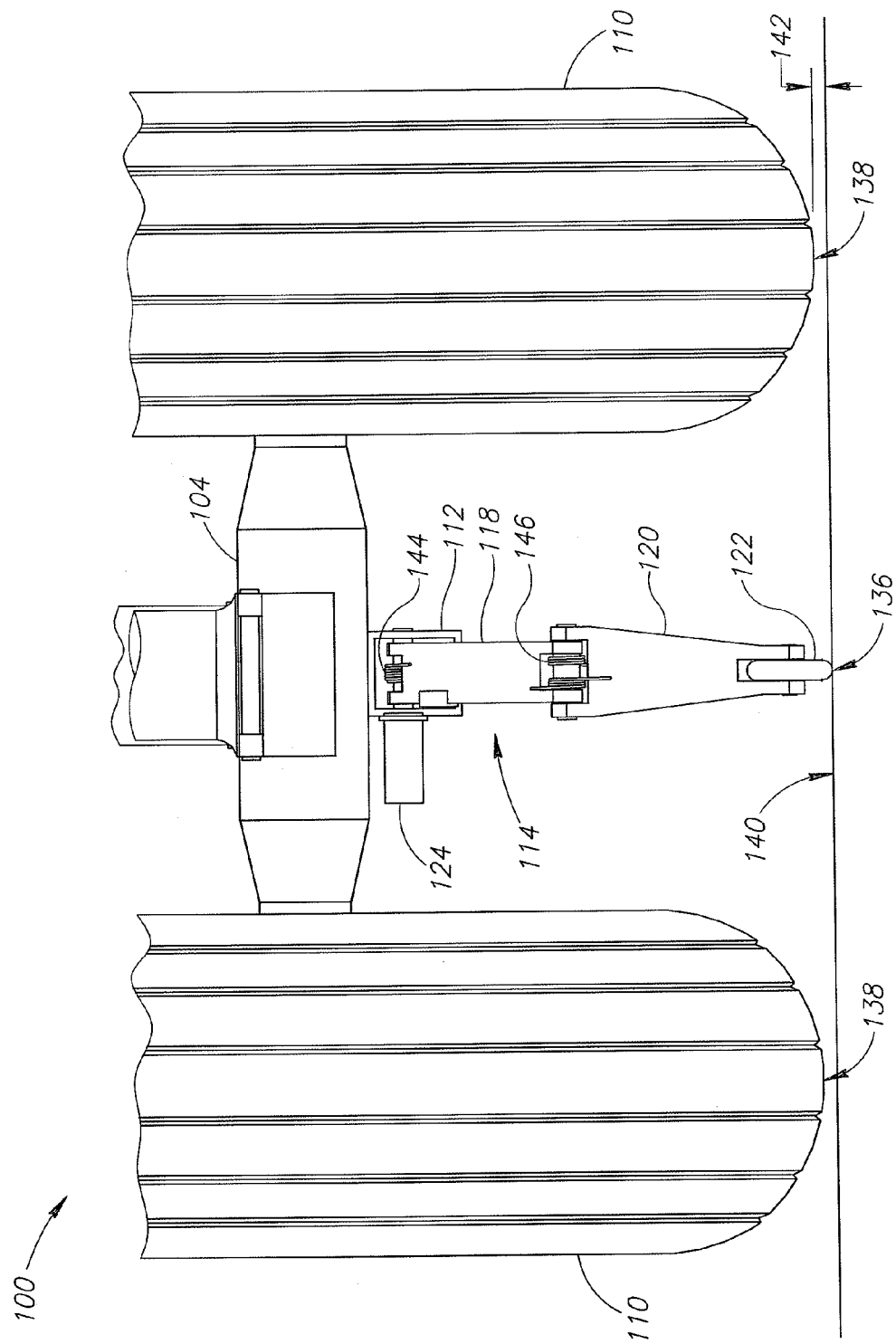
FIG. 3A shows a front elevational view of the landing gear system of FIG. 1 showing the biasing members of the ground sensing system and showing the landing gear in an airborne configuration according to an embodiment of the present invention.

FIG. 3A shows a front elevational view of the portion of the landing gear system 100 with the swing arm assembly 114 substantially centered between the tires 110 and oriented in an airborne configuration with the aircraft having zero weight on the wheels because the tires 110 have not yet made contact with a ground surface 140. As shown in the airborne configuration, a lowermost contact surface 136 of the ground contact device 122 extends lower than a lowermost contact surface 138 of one or more of the tires 110 as indicated by gap 142.

The upper arm 118 is biasly coupled to the bracket 112 with an upper biasing member 144, which may take the form of a torsional spring. Similarly, the swing arm 120 is biasly coupled to the upper arm 118 with a lower biasing member 146, which may also take the form of a torsional spring. The biasing members 144, 146 operate to maintain the swing arm assembly 114 in the airborne configuration and further operate to provide spring back of the arms 118, 120 when the swing arm assembly 114 encounters an obstacle when the aircraft is maneuvering on the ground 140 as will be described below with respect to FIGS. 5A and 5B. In one embodiment, the lower biasing member 146 is significantly stiffer than the upper biasing member 144 so that only engagements with an obstacle or having a flat tire would result in rotation of swing arm 120 about the swing arm pivot axis 128 (FIG. 2) relative to upper arm 118. In addition, the upper biasing member 144 includes a spring rate that is high enough to prevent unwanted deflection of the swing arm assembly 114 due to vibration or other low amplitude loads.

In one embodiment, the lower biasing member 146 includes a spring rate sufficient to bias the swing arm assembly 114 to a center position and yet still permit the swing arm 118 to rotate about the swing arm pivot axis 128 during at least the following conditions: (1) when the swing arm assembly 114 encounters an obstacle while the aircraft is moving forward the lower biasing member 146 permits the swing arm assembly to rotate clockwise; (2) when the swing arm assembly 114 encounters an obstacle while the aircraft is moving aft the lower biasing member 146 permits the swing arm assembly to rotate counterclockwise; and (3) when the tire becomes deflated the lower biasing member 146 permits the swing arm assembly to rotate counterclockwise.

Figure 3B:
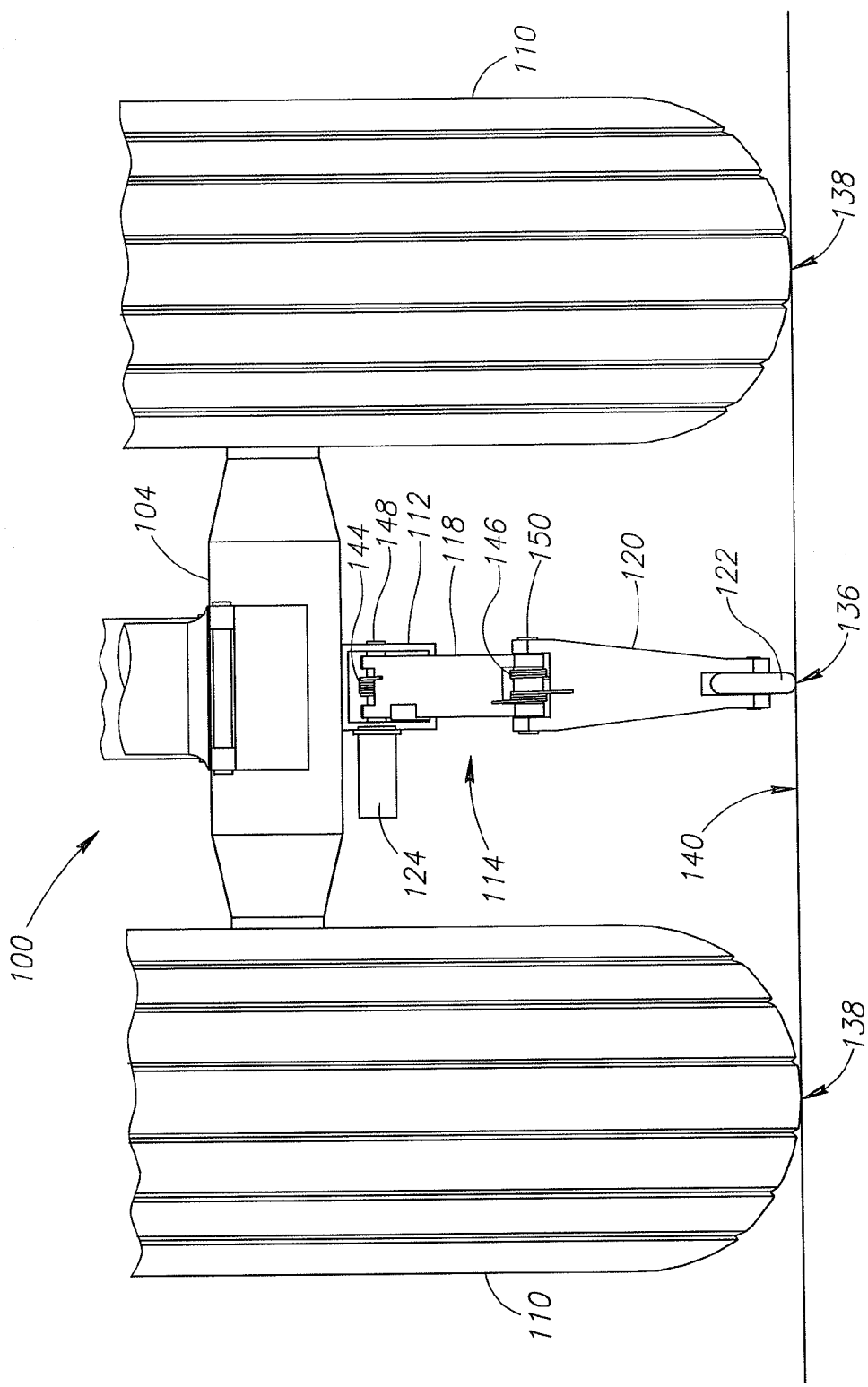
FIG. 3B shows the front elevational view of the landing gear system of FIG. 3A with the landing gear in an initial landing configuration.

FIG. 3B shows another rear elevational view of the portion of the landing gear system 100 with the swing arm assembly 114 substantially centered between the tires 110 and with the aircraft in the initial landing configuration with an initial amount of weight on the wheels as indicated by the tires 110 just making contact with the ground 140. As shown in the illustrated embodiment, the lowermost contact surface 136 of the ground contact device 122 is approximately flush with the lowermost contact surface 138 of one or more of the tires 110. In addition, all of the lowermost contact surfaces 136, 138 are shown in contact with ground surface 140. Further in the illustrated embodiment, the upper biasing member 144 is coupled to an upper pin 148 and the lower biasing member 146 is coupled to a lower pin 150.

Figure 3C:
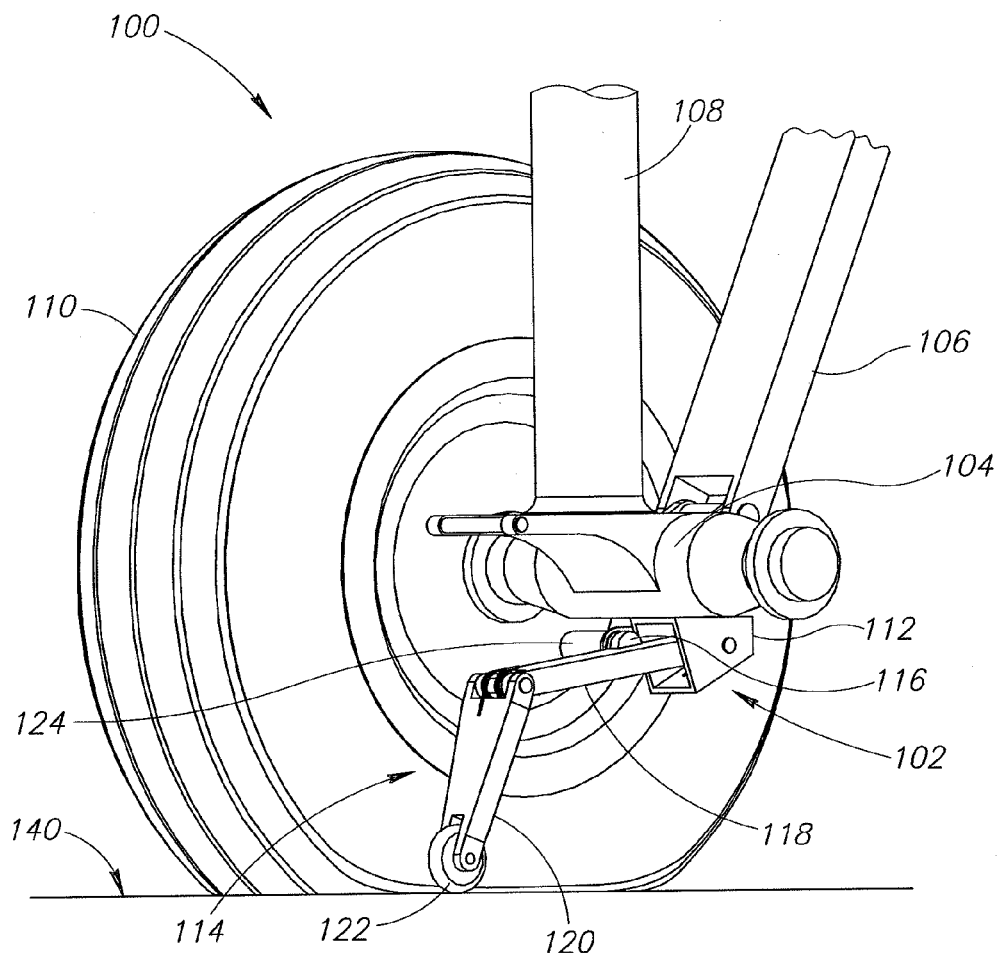
FIG. 3C shows the front elevational view of the landing gear system of FIG. 3A with the landing gear in weight-on-wheels configuration.

FIG. 3C shows the landing gear system 100 in a landed configuration in which a static weight (e.g., the 1 g weight) of the aircraft is supported on the ground 140. In the landed configuration, the swing arm assembly 114, specifically the upper arm 118 and the triggering member 116 coupled thereto, are urged upward such that the triggering member 116 sufficiently enters a field of view of the detection mechanism 124 in order to trigger the detection mechanism 124. By way of example, the triggering member 116 may be substantially aligned with a field of view of the detection mechanism 124, which may take the form of a proximity sensor, when the aircraft is in the landed configuration. The triggering member 116 may take the form of a bump, a protrusion or some other feature that extends from the upper arm 118 and is sized to induce activation of the detection mechanism 124.

In one embodiment and as noted above, the detection mechanism 124 may take the form of a proximity sensor able to detect the presence of nearby objects without any physical contact. In such an embodiment the detection mechanism 124 emits an electro-magnetic or electro-static field, or a beam of electro-magnetic radiation (e.g., infrared radiation), and detects changes or interruptions in the field or return signal. The object being sensed is often referred to as the proximity sensor's target, which in the present embodiment takes the form of the triggering member 116 or may simply be a portion of the upper arm 118. Different proximity sensor targets may demand different types of sensors, for example, a capacitive or photoelectric sensor might be suitable for a plastic target; whereas an inductive proximity sensor requires a metal target. Thus, it is appreciated that the detection mechanism 124 and the triggering member 116 may take a variety of forms. Further, the detection mechanism 124 may be adjustable to vary a maximum distance that is detectable by the detection mechanism 124. In another embodiment, the detection mechanism 124 may take the form of a mechanical switch that is triggered or activated by physical contact or engagement. In any of the aforementioned embodiments, the detection mechanism 124 is mounted to the landing gear system 100 such that it allows for the detection of the swing arm assembly 114 after it has rotated by a desired amount after contact with the ground 140. Further, activation of the detection mechanism 124 should preferably occur before any ground contact by the tire or tires and the detection mechanism 124 should remain activated as the full static weight of the aircraft is transferred onto the ground 140.

Figure 4A:
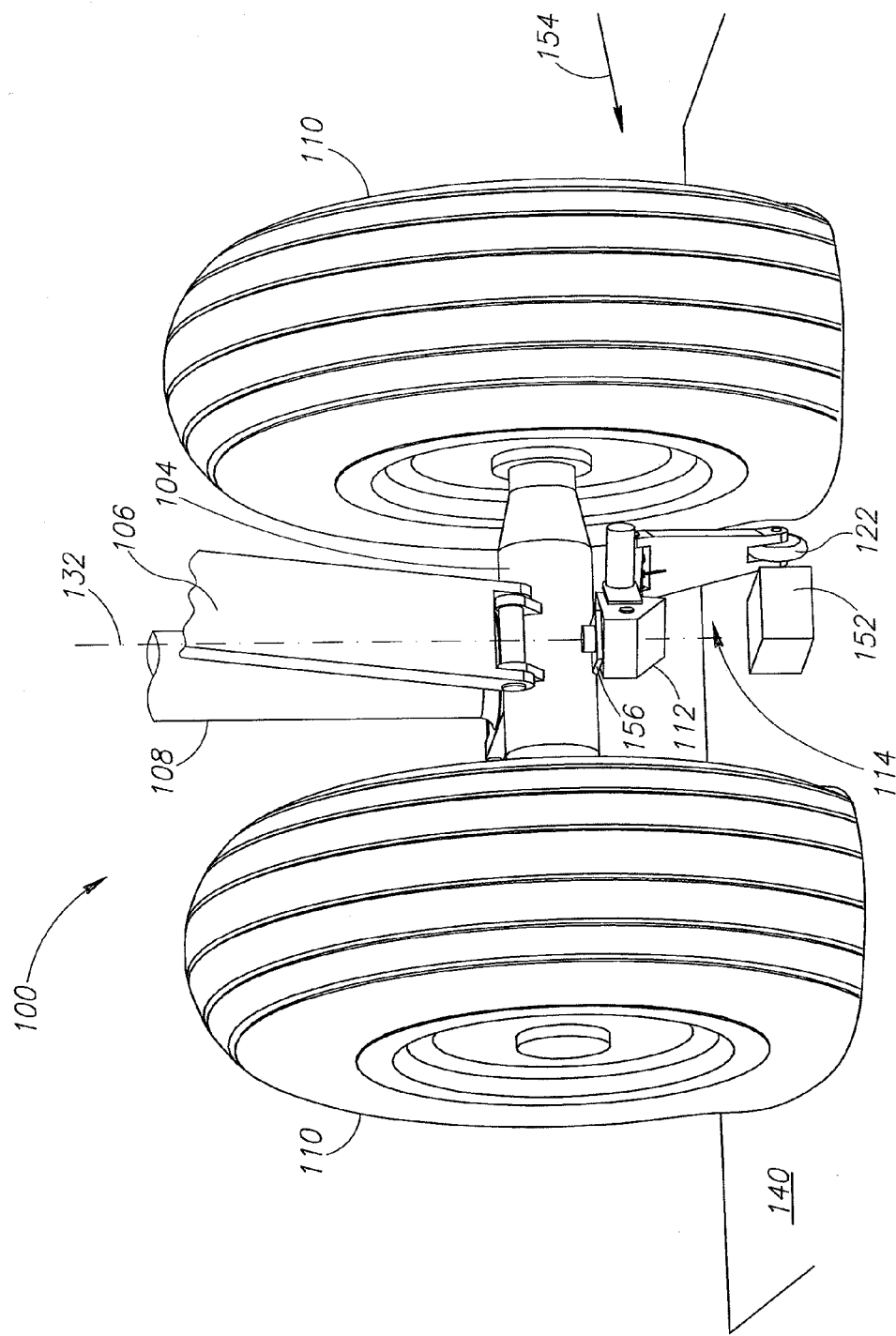
FIG. 4A shows a rear perspective view of the ground sensing system of FIG. 1 encountering an obstacle when the landing gear system is moving in a side direction according to an embodiment of the present invention.
Figure 4B:
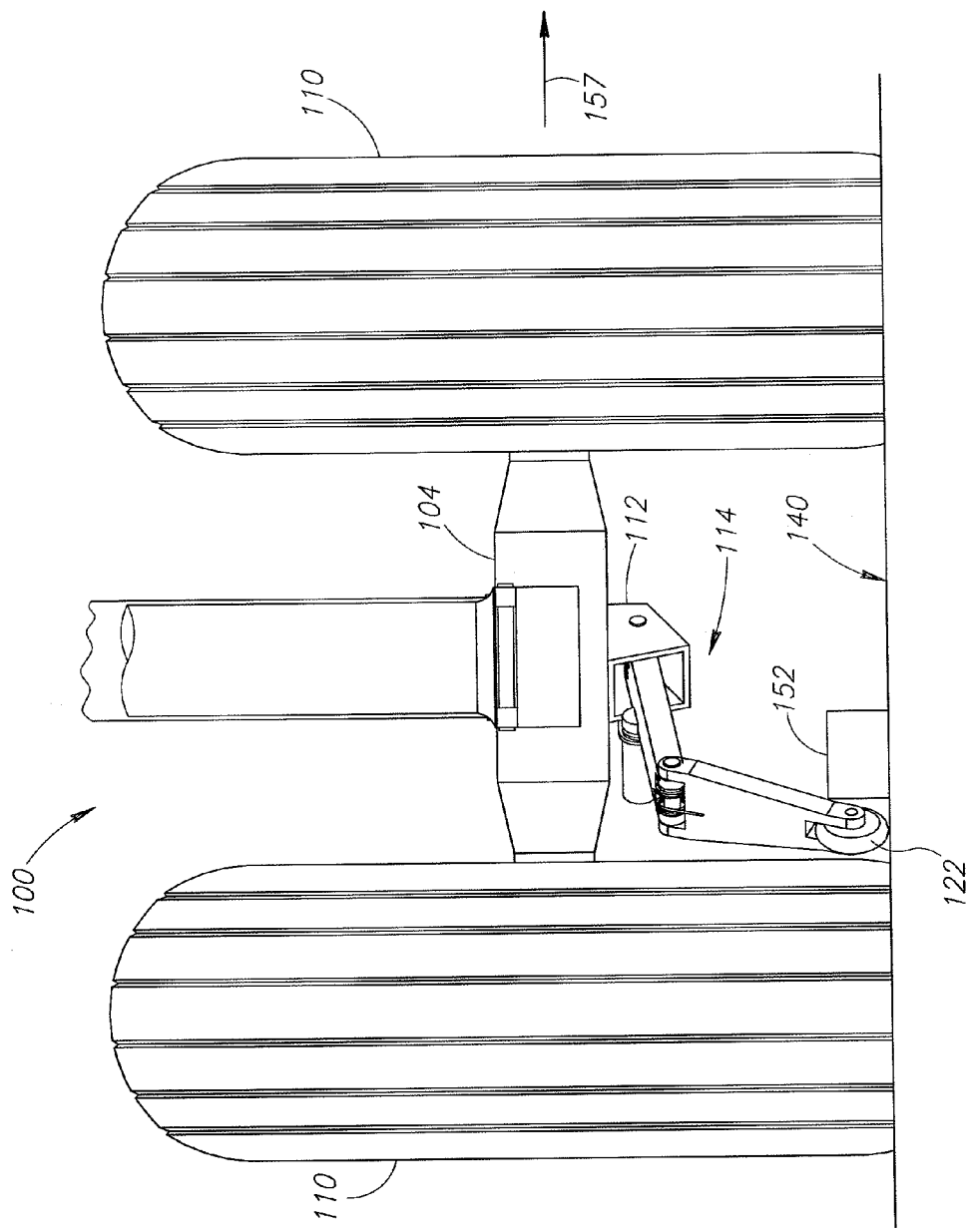
FIG. 4B shows a front perspective view of the ground sensing system of FIG. 1 encountering an obstacle when the landing gear system is moving in a side direction according to an embodiment of the present invention.

FIGS. 4A and 4B show the landing gear system 100 encountering an object 152 on the ground 140. Specifically, FIG. 4A shows the bracket 112 and the swing arm assembly 114 rotating about the bracket pivot axis 132 as the aircraft moves in a side direction 154 (e.g., right-to-left on the page). The bracket 112 is rotationally and biasly coupled to a structural flange 156 extending from the tire spindle 104. Upon contact between the swing arm assembly 114 and the object 152, the bracket 112 and swing arm assembly 114 rotate toward one tire 110 or the other. In one embodiment, the biasing apparatus (not shown) interacting with the bracket 112 and the flange 156 permits the swing arm assembly 114 to rotate from side to side by an amount allowing the ground contact device 122 to make contact with one of the tires 110. FIG. 4B shows the bracket 112 and the swing arm assembly 114 rotating about the bracket pivot axis 132 as the aircraft moves in opposite side direction 157 (e.g., left-to-right on the page). The landing gear system 100 is structurally robust enough to react an impact force generated by most obstacles. Consequently and according to one embodiment, the swing arm assembly 114 is permitted to rotate into contact with one of the tires 110, which in turn may advantageously allow the impact force to be transferred directly into the landing gear system 100.

Figure 5A:
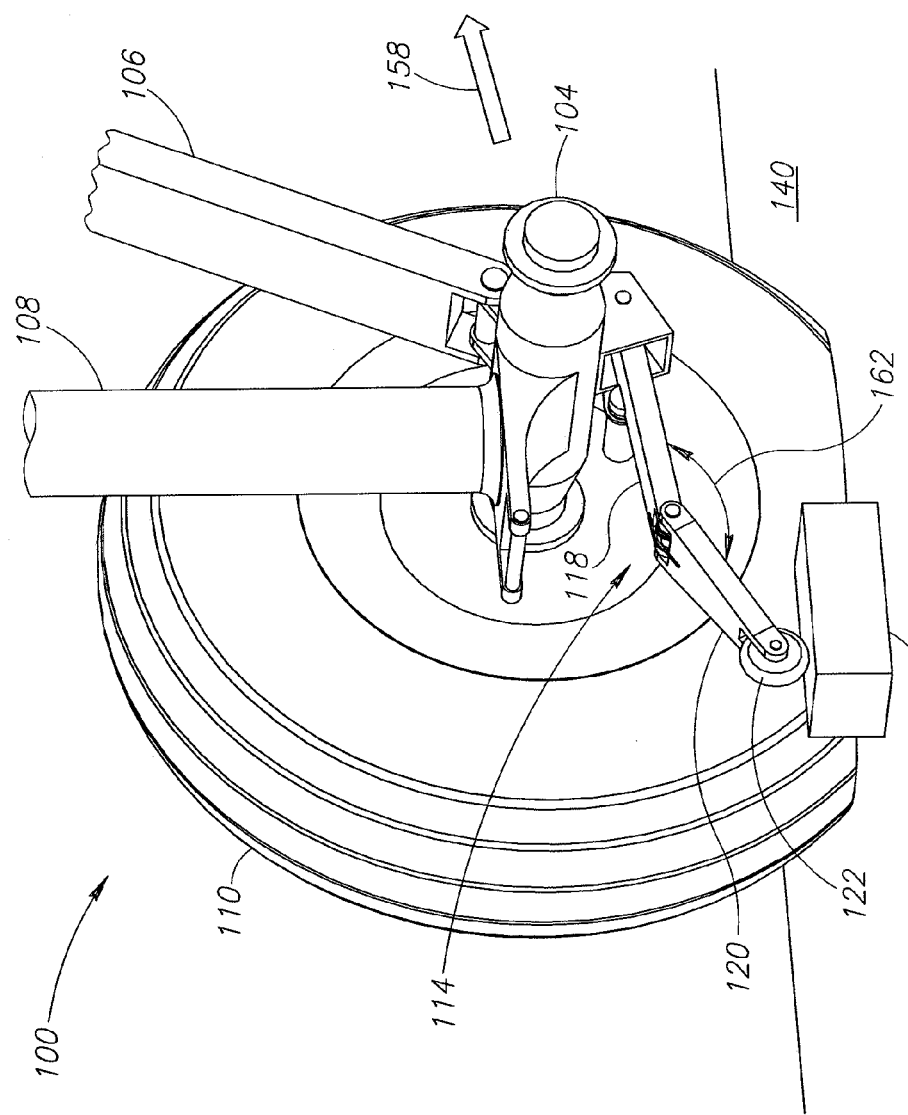
FIG. 5A shows a perspective view of the ground sensing system of FIG. 1 encountering an obstacle when the landing gear is moving in a rearward direction according to an embodiment of the present invention.

FIGS. 5A-5D show a range of motion or deflection of the swing arm assembly 114. FIG. 5A shows the deflection of the swing arm assembly 114 when encountering the obstacle 152 in a rearward manner 158 and FIG. 5B shows the deflection of the swing arm assembly 114 when encountering the obstacle 152 in a forward manner 160. In FIG. 5A, the upper arm 118 forms a first angle 162 with the swing arm 120. The first angle 162 may include a range sufficient to permit a longitudinal axis of the upper arm 118 to be oriented substantially parallel to, at an angle above, or at an angle below a horizontal line orthogonal to axes 126, 132 (FIG. 2). In FIG. 5B, the upper arm 118 forms a second angle 164 with the swing arm 120. The second angle 164 may take the form of an acute angle between the upper arm 118 and the swing arm 120 when the swing arm assembly makes contact with the obstacle 152.

Figure 5C:
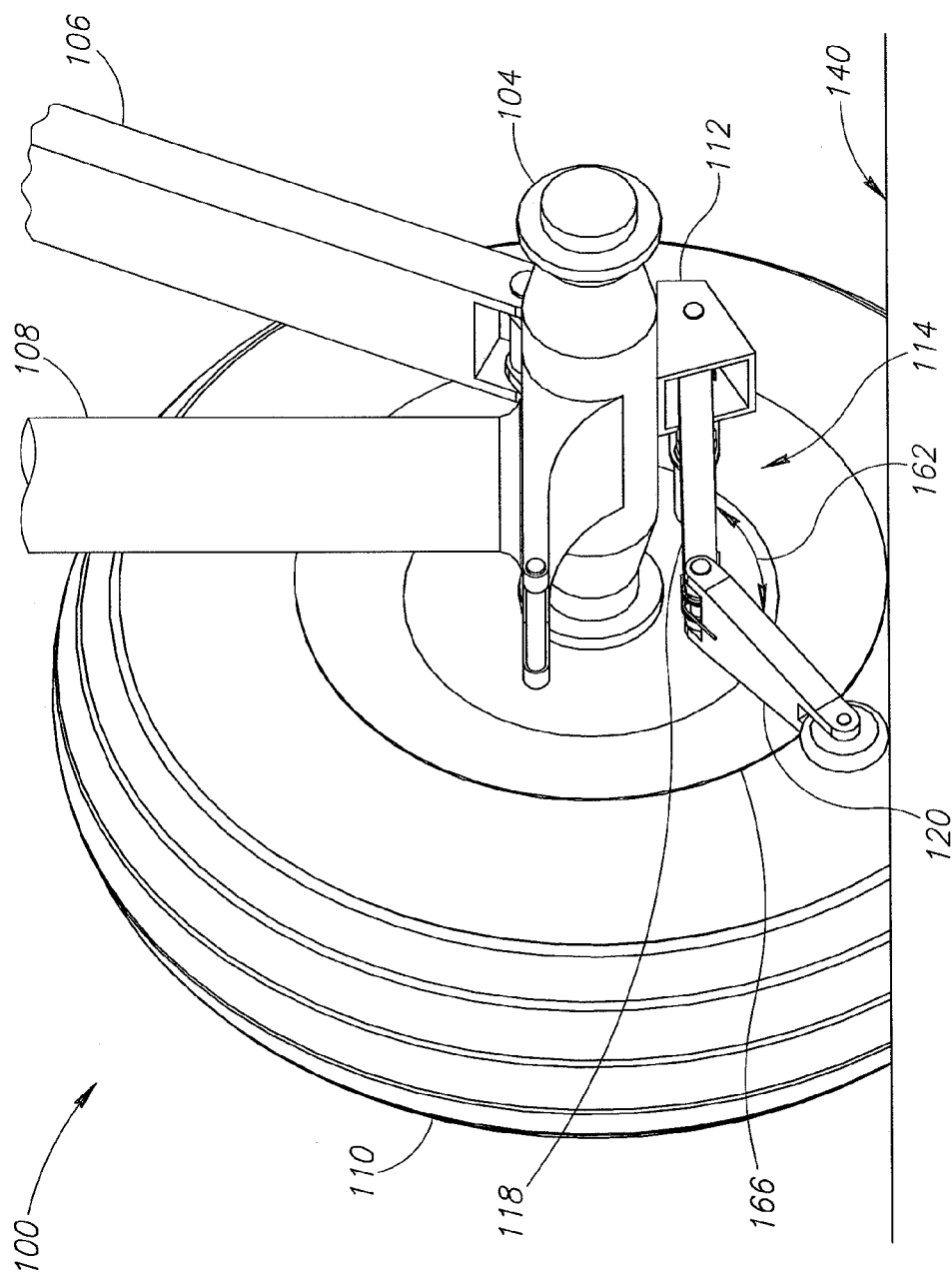
FIG. 5C shows a perspective view of the ground sensing system of FIG. 1 in a deflected position representative of a flat or missing tire according to an embodiment of the present invention.

FIG. 5C shows the landing gear system 100 with a tire rim 166 in contact with the ground 140. The tire rim 166 may contact the ground for a number of reasons such as a deflated tire 110, as illustrated, or a missing tire, for example.

Figure 5D:
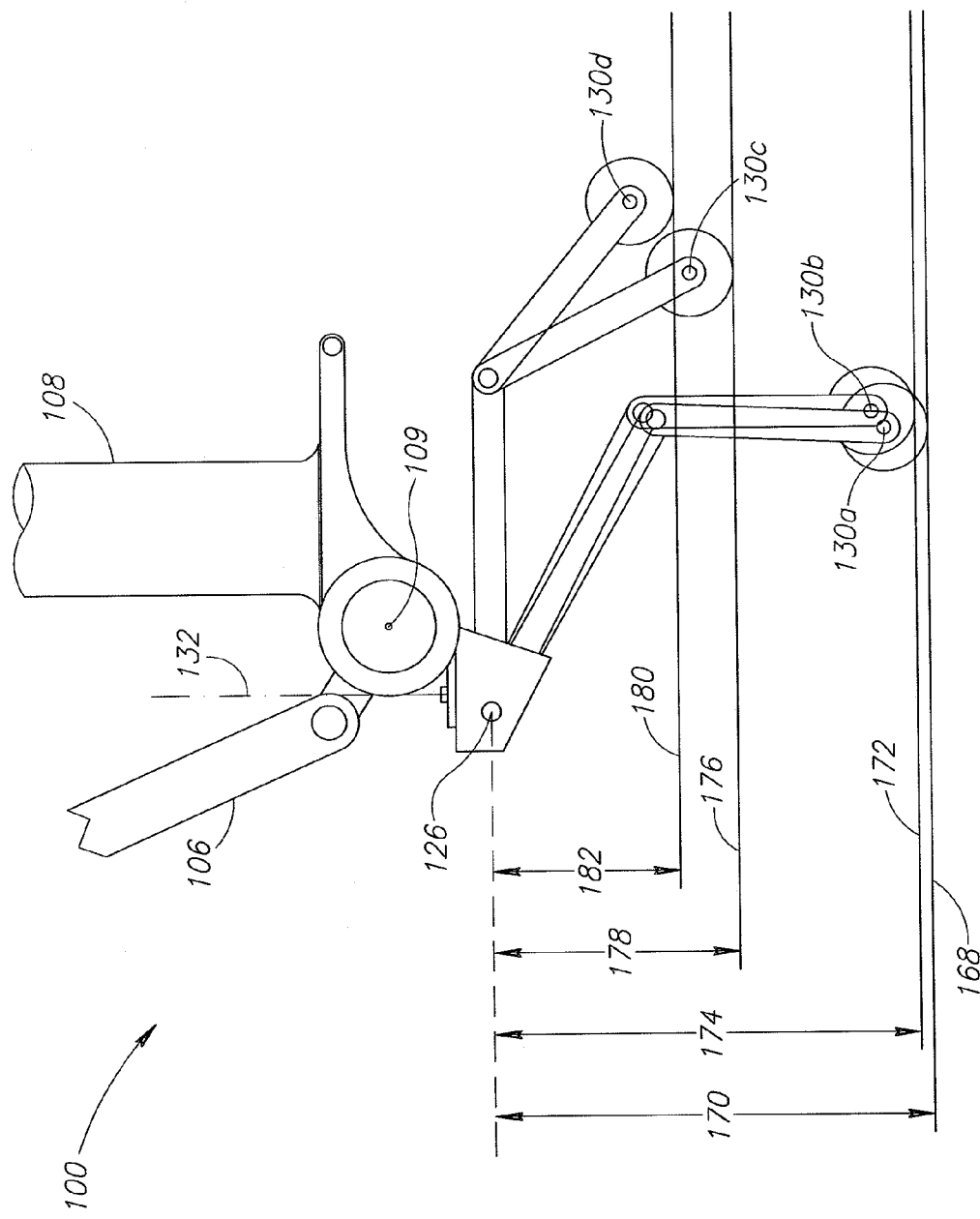
FIG. 5D shows a schematic view of the various positions of the ground sensing system of FIG. 1.

FIG. 5D schematically shows the ground sensing system 102 in a variety of positions based on different weight configurations of the aircraft. Line 168 represents a first relative distance 170 between the ground contact device axis 130a and the upper arm pivot axis 126 when the aircraft is airborne. Line 172 represents a second relative distance 174 between the ground contact device axis 130b and the upper arm pivot axis 126 just as the detection mechanism 124 is triggered or activated. Referring to FIGS. 3A and 3B, the detection mechanism 124 may be triggered as the gap 142 (FIG. 3A) begins to close. Line 176 represents a third relative distance 178 between the ground contact device axis 130c and the upper arm pivot axis 126 when the static weight of the aircraft is supported on the ground with the tire or tires in an inflated state. Lastly, line 180 represents a fourth relative distance 182 between the ground contact device axis 130*d* and the upper arm pivot axis 126 with the static weight of the aircraft is supported by the tire rim 166 (FIG. 5C). In each of the above positions, the ground contact device axis 130 moves relative to the upper arm pivot axis 126, this in turn remains fixed relative to the tire spindle axis 109. Further shown in FIG. 5D is the bracket pivot axis 132, which is biased to maintain the swing arm assembly 114 in a centered position with respect to the tires while still permitting the swing arm assembly 114 to move in either rotational direction as indicated by arrow 134.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A ground sensing system for a tire of an aircraft, the ground sensing system comprising:
    a bracket coupled to a tire spindle of the aircraft, the bracket is rotatable relative to the tire spindle about a bracket pivot axis, which is oriented substantially vertical with respect to a horizontal plane;
    an upper arm having a first end portion and a second end portion, the first end portion pivotally and biasly coupled to the bracket about an upper aim pivot;
    a swing arm having an upper end portion and a lower end portion, the upper end portion pivotally and biasly coupled to the second end portion of the upper arm;
    a ground contact device coupled to the lower end portion of the swing arm; and
    a detection mechanism located proximate to the upper arm and positioned to detect a presence of the upper arm after a portion of the upper arm rotates upward by a desired amount about the upper arm pivot.

2. The ground sensing system of claim 1, wherein the upper arm is rotatable relative to the bracket about the upper arm pivot, which defines an upper arm pivot axis.

3. The ground sensing system of claim 2, wherein the swing arm is rotatable relative to the upper arm about a swing arm pivot, which defines a swing arm pivot axis directed substantially parallel to the upper arm pivot axis.

4. The ground sensing system of claim 3, wherein the ground contact device includes a roller that is rotatable about a roller axis directed substantially parallel to the swing arm pivot axis.

5. The ground sensing system of claim 1, wherein the first end portion of the upper arm biasly coupled to the bracket includes the first end portion of the upper arm biasly coupled to the bracket with a first torsional spring.

6. The ground sensing system of claim 1, wherein the upper arm and the swing arm are oriented with respect to each other by a first angle.

7. The ground sensing system of claim 1, wherein the bracket is biased to be in a desired position relative to the tire of the aircraft.

8. The ground sensing system of claim 7, wherein the bracket is biased with a torsional spring.

9. The ground sensing system of claim 1, wherein the bracket is rotatable about the bracket pivot axis by an amount that permits the ground contact device to contact the tire of the aircraft.

10. The ground sensing system of claim 1, wherein the detection mechanism is selected from a group of motion detection mechanisms consisting of an electro-optical sensor, an electro-magnetic sensor, an electro-mechanical sensor, and a mechanical switch.

11. The ground sensing system of claim 1, wherein the detection mechanism is positioned to detect the presence of the upper arm before the tire of the aircraft contacts the ground.

12. The ground sensing system of claim 1, wherein the upper arm includes a protruding feature arranged to trigger the detection mechanism after the portion of the upper arm rotates upward by the desired amount about the upper arm pivot.

13. The ground sensing system of claim 1, further comprising a stop member coupled to the upper arm for contacting the tire spindle when the portion of the upper arm rotates sufficiently beyond the desired amount.

14. A method for detecting contact between an aircraft tire surface and a contact surface, the method comprising:
    mounting a bracket pivotally and biasly to a tire spindle coupled to the aircraft tire to permit bracket rotation about a vertical axis;
    pivotally coupling a first end portion of a swing arm assembly to the bracket, the swing arm assembly including a ground contact device distally located from the first end portion;
    positioning a contact portion of the ground contact device to be lower, when the aircraft is airborne, than a portion of the aircraft tire that contacts the contact surface; and
    receiving a signal from a detection mechanism positioned to detect a presence of a portion of the swing arm assembly after an upper arm of the swing arm assembly has rotated upward by a desired amount relative to the tire spindle.

15. The method of claim 14, wherein receiving the signal from a detection mechanism includes triggering the detection mechanism by the presence of the portion of the swing arm assembly.

16. A method for detecting contact between an aircraft surface and a contact surface, the method comprising:
    mounting a bracket to a tire spindle coupled to the aircraft tire;
    pivotally coupling a first end portion of a swing arm assembly to the bracket, the swing arm assembly including a ground contact device distally located from the first end portion;
    positioning a contact portion of the ground contact device lower than an aircraft tire when the aircraft is airborne,
    biasing a swing arm member of the swing arm assembly with the swing arm member coupled to the ground detection device, and pivotally coupled to an upper arm, which in turn is pivotally coupled to the bracket; and
    receiving a signal from a detection mechanism positioned to detect a presence of a portion of the swing arm assembly after an upper arm of the swing arm assembly has rotated upward by a desired amount relative to the tire spindle.

17. A method for detecting contact between an aircraft surface and a contact surface, the method comprising:
- mounting a bracket to a tire spindle coupled to the aircraft tire;
- pivotally coupling a first end portion of a swing arm assembly to the bracket, the swing arm assembly including a ground contact device distally located from the first end portion;
- positioning a contact portion of the ground contact device to be lower, when the aircraft is airborne, than a portion of the aircraft tire that contacts the contact surface;
- receiving a signal from a detection mechanism positioned to detect a presence of a portion of the swing arm assembly after an upper arm of the swing arm assembly has rotated upward by a desired amount relative to the tire spindle; and
- stopping rotation of the swing arm assembly using a stop member coupled to the swing arm assembly.

* * * * *